United States Patent Office 2,796,721
Patented June 25, 1957

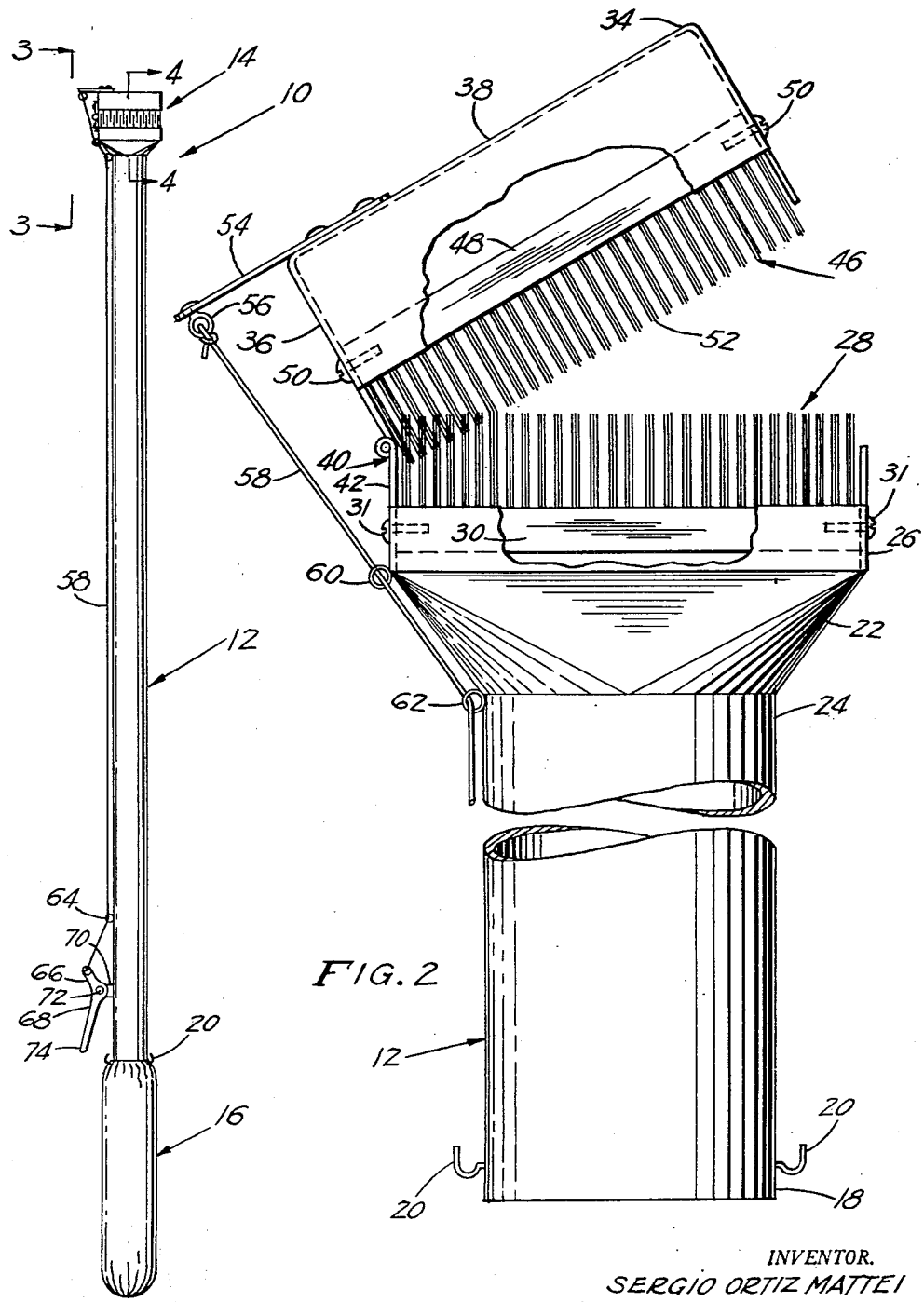

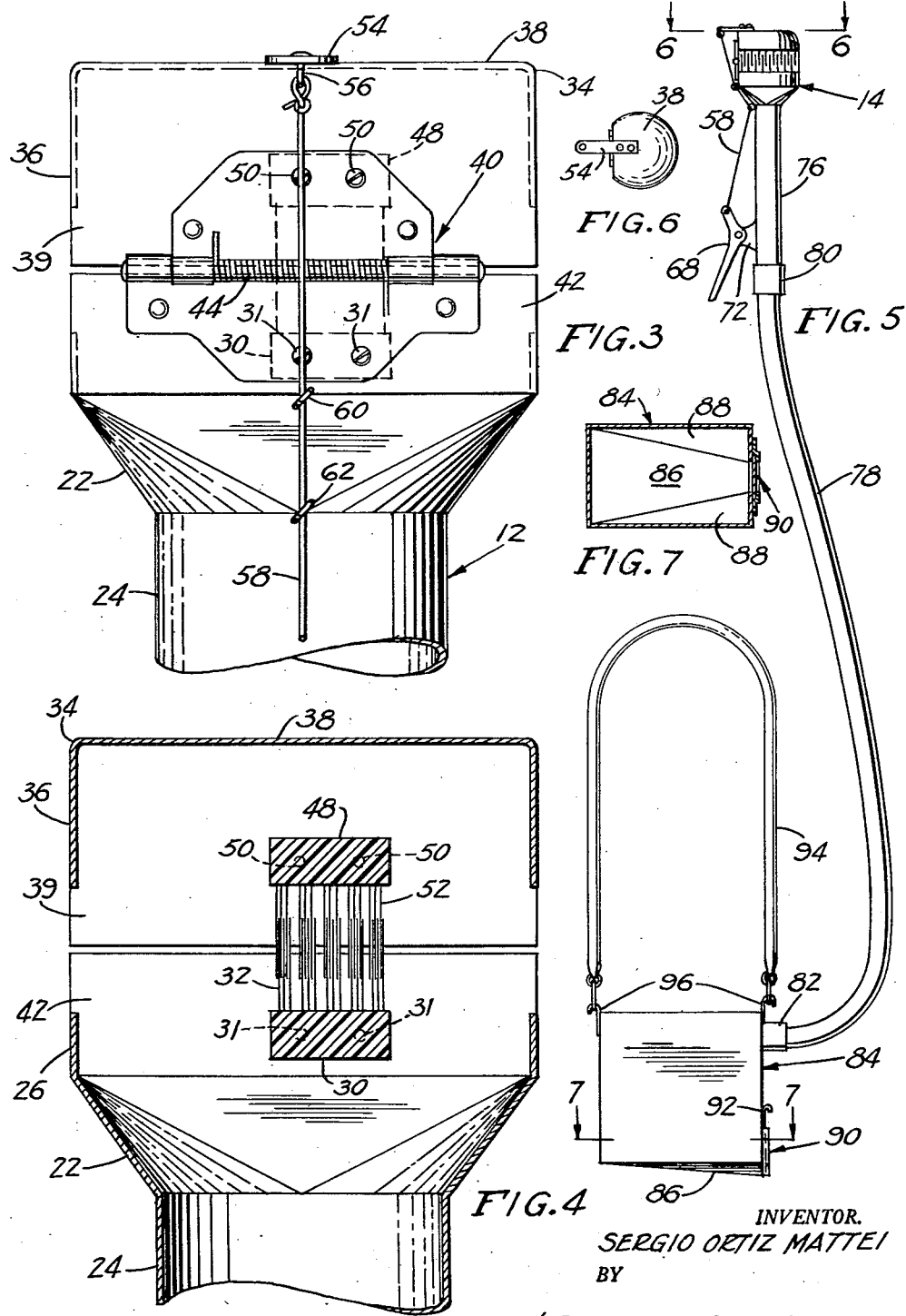

2,796,721

FRUIT PICKER

Sergio Ortiz Mattei, Jayuya, Puerto Rico

Application May 13, 1955, Serial No. 508,256

4 Claims. (Cl. 56—334)

This invention relates to fruit gathering devices, and more particularly to a device for stripping berries from coffee trees.

The principal object of this invention is to provide a gathering device to harvest coffee beans from the trees upon which they grow only when they are mature or ripe.

It is a further object of this invention to provide a coffee berry picking device which has no complex or expensive operating mechanisms, in which all of the parts are of simple, durable and easy to assemble construction and may be operated by the ordinary worker in the field.

In carrying out this invention, the device embodies amongst its features a hollow handle which defines a conduit for the picked berries, a base ring carried by the hollow tubular handle at one end thereof and extending outwardly therefrom in concentric relation about the longitudinal axis of the handle or tube, a first brush having bristles thereon extending upwardly therefrom carried by the ring and extending thereacross, a cover mounted on the ring for movement in an arcuate path about an axis normal to and to one side of the longitudinal axis of the tube into spaced parallel overlying relation with said ring, and a second brush carried by and extending across the cover with resilient means carried by the ring and operatively connected to the cover to urge said cover to move toward the ring, and means whereby the cover can be moved in its arcuate path away from the ring against the effort of the resilient means. The first and second brushes will be placed with their bristles in interengaging relation when the cover is in its position overlying the base ring in spaced overlying relation thereto so that a branch of the tree which is gripped between the bristles may have the ripe berries picked therefrom as the bristles are moved longitudinally of the branch, with the leaves and green or unripe berries remaining on the trees, and the ripe berries being picked therefrom and entering into the interior of the hollow handle and falling by gravity into a container secured to the other end of the handle or tube.

Other objects and advantages will become apparent from a consideration of the following detailed description, forming the specification, and taken in conjunction with the accompanying drawings, in which:

Figure 1 is a front elevational view of the fruit gathering device embodying this invention;

Figure 2 is an enlarged fragmentary front elevational view of the device with the tubular handle broken away intermediate its ends and without the container secured at the lower end of the tube, and being broken away in parts to show interior construction;

Figure 3 is an enlarged side elevational view as viewed substantially along line 3—3 of Figure 1 and looking in the direction of the arrows;

Figure 4 is an enlarged cross sectional view taken substantially along line 4—4 of Figure 1 and looking in the direction of the arrows;

Figure 5 is a front elevational view of a modified form of the invention;

Figure 6 is a top plan view of the head or housing at the upper end of the handle, as viewed along line 6—6 of Figure 5; and Figure 7 is a cross sectional view taken substantially along line 7—7 of Figure 5 and looking in the direction of the arrows.

With continued reference to the drawings, and with particular reference to the form of the invention shown in Figures 1 to 4, there is shown a fruit gatherer, generally indicated at 10, constructed in accordance with this invention. The fruit gatherer or coffee berry picker 10 generally comprises an elongated straight tube 12 which defines both a handle and a conduit, as will presently appear; a picking head 14 carried at one end of the tube and extending longitudinally therefrom in concentric relation about the longitudinal axis of the tube and in communication with the interior thereof; and a container or bag 16 detachably carried adjacent the other end 18 of the tube upon spaced, laterally projecting hooks 20.

A frusto-conically shaped funnel 22 has its smaller end secured to the end 24 of the tube 12 remote from the end 18, and projects longitudinally therefrom concentrically about the longitudinal axis of the tube. The head 14 is carried about the larger end of the funnel 22 and extends longitudinally outwardly therefrom in concentric relation about the longitudinal axis of the tube 12 and funnel 22.

The head 14 comprises a base ring 26 which is carried circumferentially about the larger end of the funnel 22 and extends upwardly therefrom, the base ring being made of a suitable rigid material. A brush, generally indicated at 28, has a block-like base 30 of generally rectangular cross section, as seen in Figure 4, and extends across the ring 26 in slightly offset relation with the diameter of the ring. The base 30 is preferably made of a suitable plastic material, but other materials suitable to the purpose may be employed. A plurality of transversely spaced rows of longitudinally extending bristles 32 are embedded at their lower ends in the block or base 30 and extend outwardly from the upper surface thereof in the usual manner. The bristles may be made of a suitably resistant material such as rubber or a suitable plastic such as nylon.

The head 14 is completed by the provision of a cover 34 having a cylindrical side wall 36 of the same diameter as the ring 26 and an integrally formed top wall 38 closing the end of the side wall remote from the ring. The cover 34 has its side wall 36 provided with a depending mounting plate 39 which is hingedly mounted, as by the hinge generally indicated at 40, upon an upstanding hinge plate 42 carried externally about the base ring 26 and extending outwardly thereof in a direction away from the funnel 22. Thus the cover is mounted on the base ring to move in an arcuate path about an axis disposed to one side of and in perpendicular or normal relation to the longitudinal axis of the tube, into overlying parallel relation with the base ring 26, as shown in Figure 4.

The hinge 40 is biased by a spring 44 to urge the cover 34 into the parallel overlying relation with respect to the ring 26.

A brush, generally indicated at 46, similar to the brush 28, includes a block-like base 48 of rectangular cross section and extending across the interior of the head 14 and secured at its opposite ends to the side wall 36 by any suitable fastener means such as screws 50. The base 48 may also be formed of a suitable plastic material, or any other material suitable for the purpose, and is provided with transversely spaced, longitudinally extending rows of bristles 52 embedded in the base 48 at one end and extending outwardly from the face thereof adjacent the brush 28 so that the bristles will be in interengaging relation, as shown in Figure 4, when the cover moves in its arcuate path into the overlying parallel relation with respect to the ring under the yielding influence of the spring 44.

An arm 54 is secured adjacent one end upon the top wall 38 of the cover and extends outwardly therefrom at the side thereof at which the hinge 40 is disposed, as clearly seen in Figure 2. The other end of the arm 54, remote from the end secured on the top wall 38, is provided with a depending hook 56 in the form of an eye, into which is secured one end of a flexible line 58 guided through guide rings 60 and 62 carried by the funnel 22 adjacent the upper and lower ends thereof and through another guide ring 64 carried by the tube 12 adjacent the end 18 thereof. The other end of the flexible line 58 is secured to the free end of one arm 66 of a bell crank type operating lever handle 68 pivotally mounted upon a bracket 70 carried by the tube 12 and extending laterally outwardly therefrom for movement in an arcuate path about a pivot pin 72 passing through the operating lever handle 68 and the bracket 70, which pivot pin constitutes an axis parallel to and spaced from the axis about which the cover 34 moves in its arcuate path.

Thus, by gripping the other arm 74 of the operating lever handle 68 and moving the arm 74 toward the tube 12, in a counterclockwise direction as viewed in Figure 1, a pull will be imparted to the flexible line 58 and cause the cover 34 to be moved in its arcuate path about the hinge 40 against the effort of the spring 44 and away from the ring 26 and brush 28 to effect an opening between the brushes 28 and 52, as shown in Figure 2.

In operation, the user employs the tube 12 as a handle as one hand gripping the arm 74 of the operating lever handle 68. The handle 68 is moved so as to provide the opening between the brushes 28 and 46, as shown in Figure 2, so that the picking head 14 may be placed over the branch of a coffee tree with the device 10 in the position shown in Figure 1 with respect to the trunk of the tree so that the brushes may lie transversely across the branch to which the picking head is applied. Upon release of the operating lever handle 68, the brushes will move into spaced parallel relation, as shown in Figure 4, with the bristles 32 and 52 interengaging. The device is then pulled longitudinally of the tree branch, and the bristles are of such resilience as to only cause the ripe or mature berries to be parted from the tree branch while not disturbing the leaves or the green or unripe berries. The ripe berries thus picked will gravitate through the base ring 26, funnel 22 and through the interior of the tube 12 into the bag or container 16 detachably carried at the lower end of the tube 12.

It will be apparent that upon substantial filling of the bag 16, the bag may be removed and a replacement bag to be filled detachably secured upon the hooks 20.

In the form of the invention shown in Figures 5 to 7, the head 14 is of the identical construction of that of the form of the invention shown in Figures 1 to 4. The tube 76, comparable to the tube 12, is of considerably shorter length but still mounts thereon the operating handle lever bracket 72 and the operating lever handle 68 in the same manner as in the other form of the invention with the handle 68 connected to the cover 34 of the head by a flexible line 58.

A flexible hose 78 is coupled at one end to the lower open end of the tube 76, remote from the end of the tube upon which the head 14 is carried, by a suitable fitting 80. The other end of the hose 78 is secured by a suitable fitting 82 to the upper portion of a generally rectangular, closed container, generally indicated at 84, so as to be in communication with the interior thereof. The bottom wall of the container 84 is inclined downwardly so as to define an inclined floor 86 disposed in divergent relation to the top of the container and receding downwardly as it approaches the side of the container and to which the hose 78 is attached, as shown in Figure 5.

Inclined baffles 88, generally triangular in form, as shown in Figure 7, extend with their apexes disposed at the corners of the side walls remote from the side wall into which the hose 78 is connected and their wider or base ends disposed against the opposite side wall so as to direct berries falling through the tube 76 and hose 78 into the interior of the container 84 toward the gate, generally indicated at 90.

Thus, when a sufficient amount of berries has been picked and fallen into the container 84, the plate closure 92 of the gate 90 may be opened to permit the berries to gravitate therefrom into a suitable bag, after which the gate plate closure 92 may again be disposed in its closed position.

A carrying strap or harness 94 is detachably secured at its opposite ends upon hooks 96 carried on opposite side walls of the container 84 and extending outwardly therefrom to permit the carrying of the container 84 at the side of the worker with the strap or harness draped across one shoulder.

As shown in Figure 6, the side of the cover and ring upon which the hinge 40 is secured, may be flattened to provide a level surface to which the hinge 40 may be carried by the ring 26 and operatively connected to the cover 34.

Also, with regard to the brush 30, it will be noted that this brush is secured at its opposite ends to the interior surface of the ring 26 by a suitable fastener means, such as screws 31.

The operation of the form of the invention shown in Figures 5 to 7, will be substantially the same as that of the form of Figures 1 to 4 with regard to the picking head.

While there is shown and described the preferred embodiment of the invention, it is to be understood that the structure is susceptible to change and modification within the practicability of the invention and therefore should be limited only by the scope of the claims.

What is claimed is:

1. A fruit picking device comprising a hollow tube, a frusto-conical shaped funnel having the smaller end secured to one end of said tube and having the larger end projecting longitudinally from said one end of said tube, a head including a base ring carried circumferentially about the larger end of said funnel and extending outwardly therefrom, a cover mounted on the ring for movement in an arcuate path about an axis normal to and to one side of the longitudinal axis of said tube into spaced overlying relation to said ring, a brush carried by said ring and having bristles projecting therefrom toward said cover, another brush carried by said cover and having bristles extending toward said first brush bristles, the bristles of said brushes interengaging when said cover moves into overlying parallel relation with said ring to grip a tree branch for removal of fruit therefrom, and resilient means disposed along the axis about which said cover moves to urge said cover into overlying parallel relation with said ring.

2. A fruit picking device comprising a hollow tube, a frusto-conical shaped funnel having the smaller end secured to one end of said tube and having the larger end projecting longitudinally from said one end of said tube, a head including a base ring carried circumferentially about the larger end of said funnel and extending outwardly therefrom, a cover mounted on the ring for movement in an arcuate path about an axis normal to and to one side of the longitudinal axis of said tube into spaced overlying relation to said ring, a brush carried by said ring and having bristles projecting therefrom toward said cover, another brush carried by said cover and having bristles extending toward said first brush bristles, the bristles of said brushes interengaging when said cover moves into overlying parallel relation with said ring to grip a tree branch for removal of fruit therefrom, and resilient means disposed along the axis about which said cover moves to urge said cover into overlying parallel relation with said ring, and means carried by said tube and operatively connected to said cover to move said cover in its arcuate path against the effort of said resilient means to effect an opening between said brushes for the reception of a tree branch therebetween.

3. A fruit picking device comprising a hollow tube, a frusto-conical shaped funnel having the smaller end secured to one end of said tube and having the larger end projecting longitudinally from said one end of said tube, a head including a base ring carried circumferentially about the larger end of said funnel and extending outwardly therefrom, a cover mounted on the ring for movement in an arcuate path about an axis normal to and to one side of the longitudinal axis of said tube into spaced overlying relation to said ring, a brush carried by said ring and having bristles projecting therefrom toward said cover, another brush carried by said cover and having bristles extending toward said first brush bristles, the bristles of said brushes interengaging when said cover moves into overlying parallel relation with said ring to grip a tree branch for removal of fruit therefrom, and resilient means disposed along the axis about which said cover moves to urge said cover into overlying parallel relation with said ring, and means carried by said tube and operatively connected to said cover to move said cover in its arcuate path against the effort of said resilient means to effect an opening between said brushes for the reception of a tree branch therebetween, and a bag detachably carried by said tube at the other end thereof for receiving picked fruit therein passing through said tube.

4. A fruit picking device comprising a hollow tube, a frusto-conical shaped funnel having the smaller end secured to one end of said tube and having the larger end projecting longitudinally from said one end of said tube, a head including a base ring carried circumferentially about the larger end of said funnel and extending outwardly therefrom, a cover mounted on the ring for movement in an arcuate path about an axis normal to and to one side of the longitudinal axis of said tube into spaced overlying relation to said ring, a brush carried by said ring and having bristles projecting therefrom toward said cover, another brush carried by said cover and having bristles extending toward said first brush bristles, the bristles of said brushes interengaging when said cover moves into overlying parallel relation with said ring to grip a tree branch for removal of fruit therefrom, and resilient means disposed along the axis about which said cover moves to urge said cover into overlying parallel relation with said ring, and means carried by said tube and operatively connected to said cover to move said cover in its arcuate path against the effort of said resilient means to effect an opening between said brushes for the reception of a tree branch therebetween, a flexible hose having one end coupled to the end of said tube remote from said head, a container to be carried on the body of the user having the other end of the hose connected thereto and in communication with the interior thereof to deposit the picked fruit into the container.

References Cited in the file of this patent

UNITED STATES PATENTS

| 145,979 | Weston | Dec. 30, 1873 |
| 435,206 | Cain | Aug. 26, 1890 |
| 716,082 | McKinly | Dec. 16, 1902 |
| 1,263,505 | Young | Apr. 23, 1918 |
| 1,296,236 | Uhlarick | Mar. 4, 1919 |